Jan. 23, 1923.
R. M. KEENEY.
ELECTRIC FURNACE.
FILED SEPT. 7, 1920.
1,443,024.
2 SHEETS—SHEET 1.
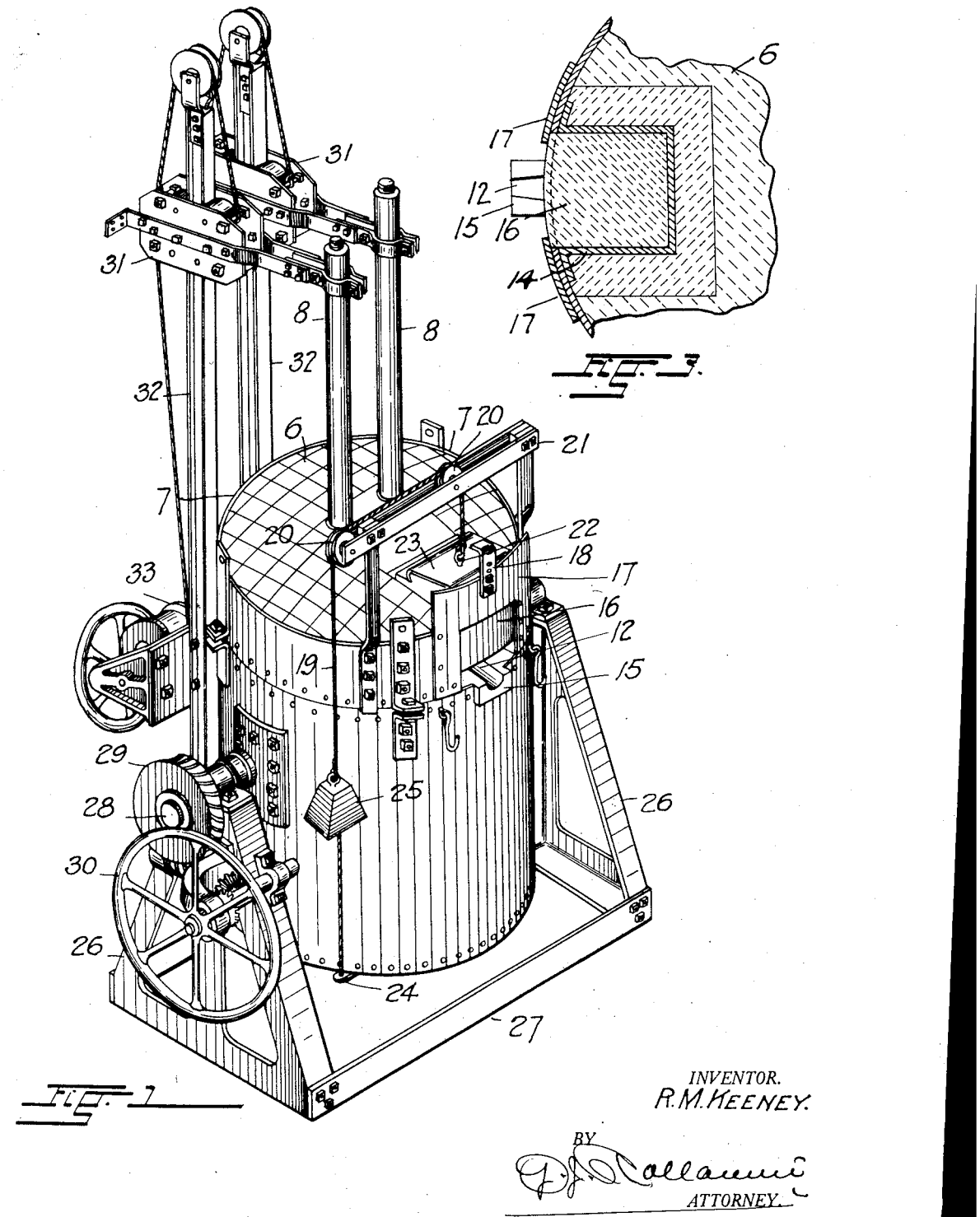
INVENTOR.
R. M. KEENEY.
BY
ATTORNEY.

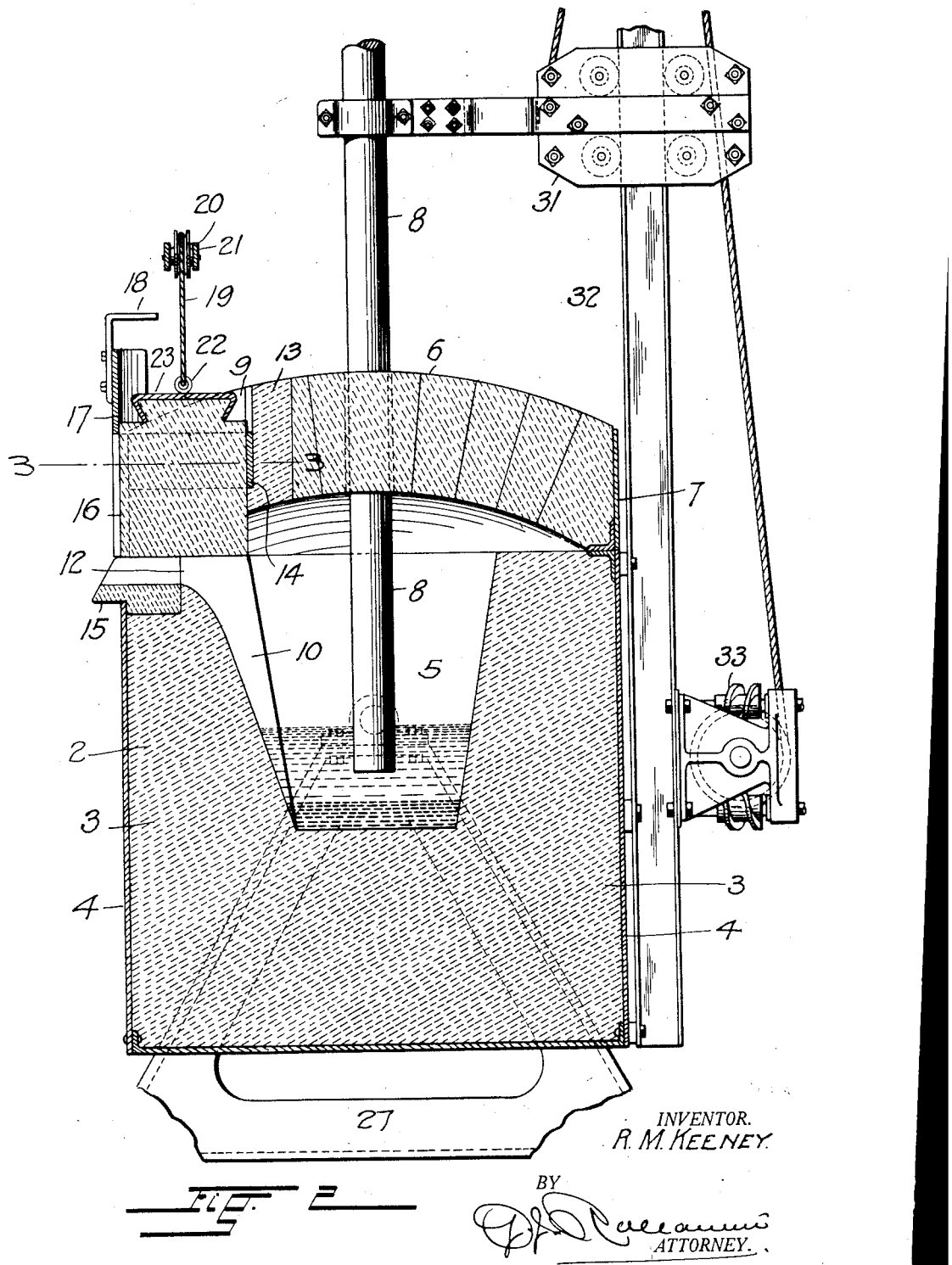

Patented Jan. 23, 1923.

1,443,024

UNITED STATES PATENT OFFICE.

ROBERT M. KEENEY, OF DENVER, COLORADO.

ELECTRIC FURNACE.

Application filed September 7, 1920. Serial No. 408,591.

*To all whom it may concern:*

Be it known that I, ROBERT M. KEENEY, a citizen of the United States, residing at Denver, in the county of Denver and State of Colorado, have invented certain new and useful Improvements in Electric Furnaces, of which the following is a specification.

This invention relates to improvements in electric furnaces and its principal object is to produce by the provision of an unbroken structure, a crucible of greater depth than found in furnaces of the same type at present in use.

I attain the above object by forming the charge opening of the furnace in its roof instead of in its body structure and by providing a convenient and dust-proof means for closing the opening while the furnace is in operation.

The unbroken body structure not only allows of forming a crucible adapted to continuously contain a charge of greater depth, but also increases the strength of the construction and avoids the use of reenforcements required in furnaces in which the charge opening breaks into the circumferential wall of the crucible.

The deep crucible of the present invention allows of the presence of a thick layer of slag between the ends of the electrodes and the melted metal in the bottom portion of the crucible, thereby preventing loss by volatilization which heretofore has been of considerable consequence, especially in the treatment of silver ore, and permitting of the use of a low voltage current which causes the material to melt by resistance rather than by the direct heat of the voltaic arc.

By virtue of the above, my invention may be considered as being the basis of a novel method of melting ores and other substances by electricity, which has many advantages and is particularly adapted for use in smelting cyanide precipitates obtained in the cyanide process of extracting metals from their ores.

The new method above referred to consists in first charging the furnace with a flux to a point above the ends of electrodes extending into the crucible and feeding the precipitate or other material onto this layer of flux after it has been reduced to a liquid state by the heat of the arc.

The material resting upon the bed of flux is melted by the heat thereof instead of by the direct action of the arc passing between the end of the electrodes and the melted metal falling to the bottom of the crucible is constantly covered by the slag which thereby prevents volatilization as mentioned hereinbefore.

The constantly accumulating slag may be poured off the melted metal by the usual method of tilting the furnace and fresh flux is added with the charge until the melted metal reaches a determinate level in the crucible when the slag is first poured off the metal and the latter is discharged into a separate container.

An embodiment of my invention has been shown in the accompanying drawings in which—

Figure 1 is a perspective view of my improved furnace;

Figure 2, a vertical section of the same, and

Figure 3, a section along the line 3—3, Figure 2.

The reference character 2 designates the body structure of the furnace which is composed of a heavy lining 3 of fire brick or other refractory metal formed within a metal shell 4.

The interior of the structure constitutes a crucible 5 in which the material is melted, and it is covered by an arched roof 6 preferably made of fire brick inside a metal reenforcing band 7.

The joint between the roof and the body section of the furnace is luted to prevent the escape of gases and the electrodes 8 which extend into the crucible, pass through openings in the roof which if so desired, may be rendered impervious to gases by the provision of the usual glands or stuffing boxes.

The roof has a peripheral recess 9 which communicates with a duct 10 in the wall of the crucible terminating in a tap opening 12 in the upper edge of the same.

The opening of the roof is lined by a tile 13 which is reenforced upon its inner surface by a correspondingly shaped wear-band 14 and the tap-opening in the wall of the body-structure has a lining 15 likewise made of tile which, projecting beyond the circumferential surface of the structure, provides a spout for the discharge of the melted contents of the crucible.

The lined opening of the roof is normally occupied by a door 16 of fire brick which closes the entrance to the crucible above the tap opening and the latter is plugged with clay or tile while the furnace is in operation to prevent the escape of heat and gases.

A channeled plate 17 fastened to the band of the roof and projecting upwardly therefrom cooperates with the reenforcing band 14 to provide a metal guide way for the door when it is raised to uncover the entrance to the crucible, and a bent strap 18 fastened to the plate 17 and extending above the upper edge thereof, forms a stop which limits the upward movement of the door.

The opening movement of the door is effected through the medium of a rope 19 trained over sheaves 20 on a gallows frame 21 erected on the roof of the furnace, and fastened to the door by means of an I-bolt 22 on a gripper plate 23 which embraces a rib of dove-tailed section at the top thereof.

The rope may be fastened to a ring or cleat 24 at the bottom of the body structure and it carries a weight 25 which counterbalances the door and thereby facilitates its opening movement.

The furnace is as usual pivotally hung upon standards 26 of a supporting structure 27 by oppositely extending trunnions 28 one of which is connected with a worm movement 29 which through the medium of a hand-wheel 30 operates to tilt the furnace for the discharge of the slag and melted metal through the tap spout 15.

The electrodes 8 are as usual suspended from carriages 31 which slide along upright standards 32 fastened to the furnace and which are connected with a winding drum 33 for vertical adjustment.

Having thus described my invention what I claim and desire to secure by Letters-Patent is:

1. An electric furnace comprising a crucible open at its top, a roof superimposed on the circumferential wall of the crucible and having at a point above the wall, a feed-opening in connection with the space inside the same, and an upwardly sliding door fitted in the opening.

2. An electric furnace comprising a body structure having a crucible open at the top thereof, a roof covering the body structure and having a recess in its circumferential edge, in connection with the crucible, a tile lining in said recess and a sliding door closing said opening.

3. An electric furnace comprising a body structure having a crucible open at the top thereof, a roof covering the body structure and having a peripheral recess providing an entrance to the crucible, a guide-plate at the front of said recess, and a door fitted in the recess and having an upwardly sliding movement along said plate.

4. An electric furnace comprising a body structure having a crucible open at the top thereof, a roof covering the body structure and having a peripheral recess providing an entrance to the crucible, a reenforcing band in the recess, a guide plate at the front of the same, and a door fitted in the recess and having an upward sliding movement between said band and said plate.

5. An electric furnace comprising a body structure having a crucible open at the top thereof, and a tap-opening at the upper edge of the crucible, a roof covering the body structure and having a peripheral recess providing an entrance to the crucible above said tap-opening, and a door closing the recess.

6. An electric furnace comprising a body-structure having a crucible open at the top thereof, a channel in the wall of the crucible, and a tap-opening at the upper edge of the same, connected with said channel, a roof covering the body structure and having a recess in its circumferential edge, communicating with the tap opening to provide an entrance to the crucible above said opening, and a door closing said recess.

7. An electric furnace comprising a body structure having a crucible open at the top thereof, a channel in the wall of the crucible, and a tap-opening at the upper edge of the same, connected with said channel, a roof covering the body structure and having a recess in its circumferential edge, communicating with the tap opening to provide an entrance to the crucible above said opening, and an upwardly sliding door, normally resting on said body structure and fitted in said recess.

8. An electric furnace comprising a body structure having a crucible open at the top thereof, a roof covering the body structure and having a recess in its circumferential edge, in connection with the crucible, a tile lining in said recess, a metal band reenforcing the lining at the outer surface thereof, and a sliding door closing said recess, in engagement with said surface.

In testimony whereof I have affixed my signature.

ROBERT M. KEENEY.